(12) United States Patent
Berman et al.

(10) Patent No.: US 7,124,712 B2
(45) Date of Patent: Oct. 24, 2006

(54) PET BRUSH SYSTEM

(76) Inventors: Paul Berman, 4650 Tenth St., Santa Monica, CA (US) 00404; Jay Lefkovitz, 141 Vaughns Gap Rd., Nashville, TN (US) 37205; Roy Bradbury, 9431 Via Patrica, Burbank, CA (US) 91504

( * ) Notice: Subject to any disclaimer, the term of this patent is extended or adjusted under 35 U.S.C. 154(b) by 0 days.

(21) Appl. No.: 09/947,036

(22) Filed: Jul. 12, 2001

(65) Prior Publication Data

US 2002/0029749 A1 Mar. 14, 2002

Related U.S. Application Data

(63) Continuation-in-part of application No. 09/456,067, filed on Dec. 6, 1999, now abandoned.

(51) Int. Cl.
*A01K 13/00* (2006.01)
(52) U.S. Cl. ....................... 119/628; 119/633
(58) Field of Classification Search ............... 119/612, 119/614, 628, 633, 624, 625; 132/119, 120, 132/150, 160; D28/21; D30/158, 159; 15/159.1; D4/132, 134, 159
See application file for complete search history.

(56) References Cited

U.S. PATENT DOCUMENTS

| | | | | |
|---|---|---|---|---|
| 1,149,608 A | * | 8/1915 | Wilson | 119/633 |
| 2,431,865 A | * | 12/1947 | Dempsey | 132/119 |
| 2,613,678 A | * | 10/1952 | Mandato | 132/119 |
| 5,267,528 A | * | 12/1993 | Murieen, Sr. | 119/628 |
| 5,862,563 A | * | 1/1999 | Hartmann | 132/119 |
| 5,890,255 A | * | 4/1999 | Robinson | 119/628 |

* cited by examiner

*Primary Examiner*—Teri Pham Luu
*Assistant Examiner*—Elizabeth Shaw

(57) ABSTRACT

A pet brush including a brush body; which has a central aperture therethrough and a lower cylindrical peripheral wall of an enlarged diameter and an upper peripheral wall; a handle, which is adapted to be grasped by a user with a free proximal end and a cylindrical distal end with an aperture; a bristle pad, which is provided with a plurality of bristles; which have tips at a location remote from the brush body and the upper ends coupled to the bristle pad and located within the cylindrical lower wall of the brush body; a push plate, which is included with apertures receiving the bristles therethrough and included with an interior central rod extending through the central aperture of the brush body to an operator controlled push button secured to the upper end thereof; a spring within the upper cylindrical peripheral wall of the brush body adapted to push the push button away from the bristle pad and adapted to be contracted upon the depression of the push button to move the central rod downwardly.

13 Claims, 3 Drawing Sheets

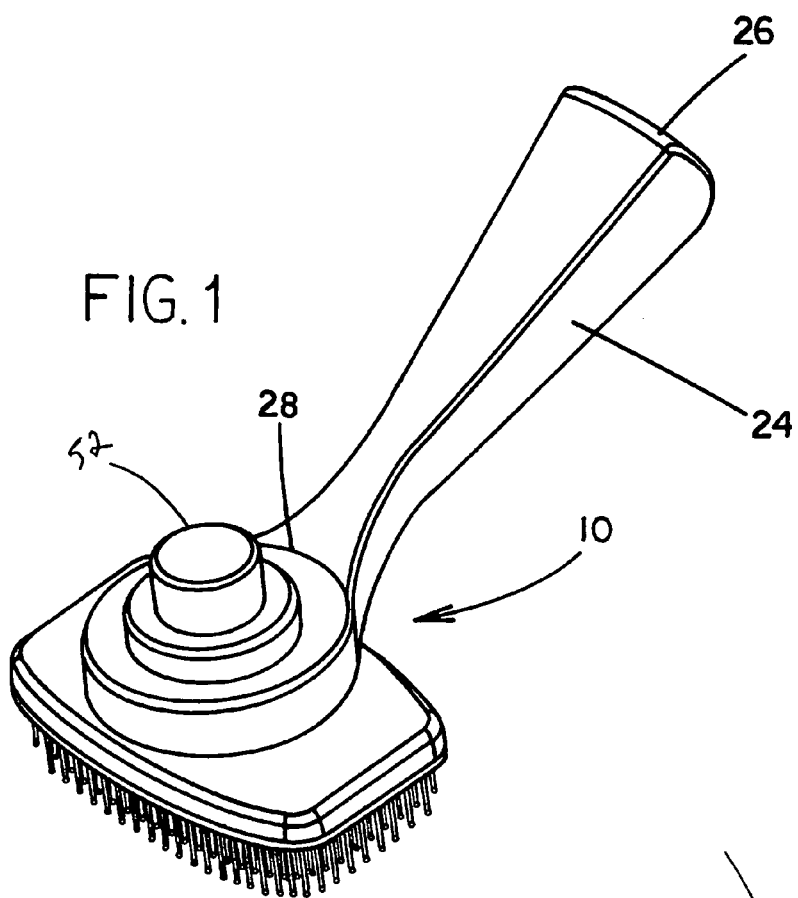
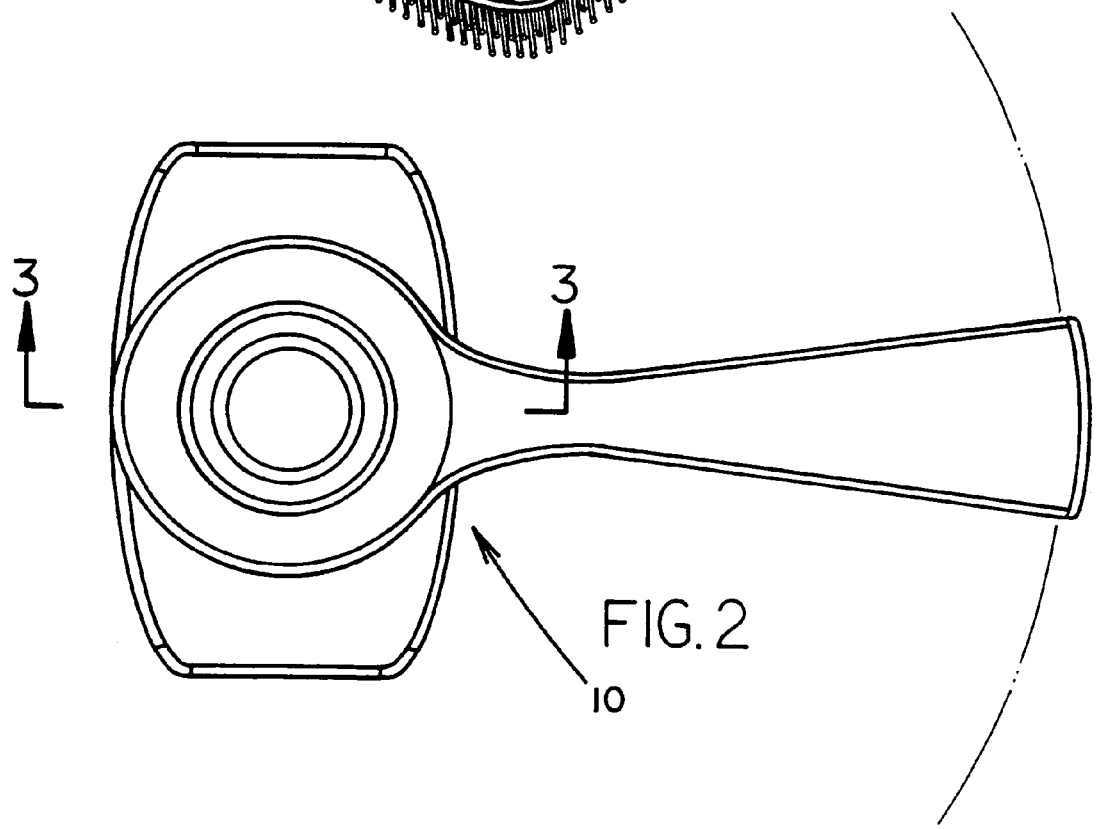

PET BRUSH SYSTEM

The present application is a continuation-in-part of application Ser. No. 09/456,067, filed on Dec. 6, 1999 now abandoned and having the title PET BRUSH SYSTEM.

BACKGROUND OF THE INVENTION

1. Field of the Invention

The present invention relates to a pet brush system and more particularly pertains to removing hair from the bristles of a brush.

2. Description of the Prior Art

The use of brushes of known designs and configurations is known in the prior art. More specifically, brushes of known designs and configurations heretofore devised and utilized for the purpose of removing hair from bristles of a brush through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,600,865 to Morrison discloses a Hair Brush With Attached Cleaning Feature. U.S. Pat. No. 5,365,880 to South discloses a Grooming and Dispensing Brush. U.S. Pat. No. 5,603,137 to Hasan discloses a Brush With Cleaning Attachment. U.S. Pat. No. 4,977,909 to Chou discloses a Push-Button Type Retractable Brush. U.S. Pat. No. 4,225,997 to Thomas et al. discloses a Self-Cleaning Brush. U.S. Pat. No. 4,412,365 to Schmitt discloses a Brush. U.S. Design Pat. No. Des. 313,124 to Gullett discloses a Combined Hairbrush and Bristle Cleaning Attachment. U.S. Pat. No. 4,574,416 to Stewart et al. discloses Retractable Brushes. U.S. Pat. No. 5,343,880 to McKay discloses a Fluid Dispensing Wand. U.S. Pat. No. 4,938,621 to Pyrozyk discloses a Hair Brush and Mousse Dispensing Device. U.S. Design Pat. No. Des. 362,9643 to Sanchez discloses a Gel Dispensing Brush. U.S. Pat. No. 5,297,882 to Kornides discloses a Liquid Dispensing Brush With Cam Valve. U.S. Pat. No. 5,443,321 to Dolan et al. discloses a Dispensing Brush Head. U.S. Pat. No. 4,847,937 to Gorski discloses a Hair Brush. U.S. Pat. No. 5,519,912 to Kawamura discloses a Hairbrush Having Means to Collect Trapped Strands of Hair for Removal From the Bristles. U.S. Pat. No. 4,988,228 to Yeh discloses a Brush With Extendible and Retractable Bristle Elements. Lastly, U.S. Design Pat. No. Des. 374,556 to Nguyen discloses a Self-Cleaning Hairbrush.

While these devices fulfill their respective, particular objectives and requirements, the aforementioned patents do not describe pet brush as disclosed herein.

In this respect, the pet brush according to the present invention substantially departs from the conventional concepts and designs of the prior art, and in doing so provides an apparatus primarily developed for the purpose of Removing hair from the bristles of a brush.

Therefore, it can be appreciated that there exists a continuing need for a new and improved pet brush which can be used for removing hair from the bristles of a brush. In this regard, the present invention substantially fulfills this need.

SUMMARY OF THE INVENTION

In view of the foregoing disadvantages inherent in the known types of brushes of known designs and configurations now present in the prior art, the present invention provides an improved pet brush. As such, the general purpose of the present invention, which will be described subsequently in greater detail, is to provide a new and improved pet brush and method which has all the advantages of the prior art and none of the disadvantages.

To attain this, the present invention essentially comprises a new and improved pet brush system. The pet brush system has a rotating handle and a sliding perforated plate for removing hair from the bristles of the brush when the plate slides from the base of the bristles to the tips of the bristles.

The system includes a brush body. The brush body is in a generally rectangular configuration and has a central aperture therethrough and a lower rectangular peripheral wall of an enlarged size and an upper cylindrical peripheral wall of a reduced diameter.

A handle is adapted to be grasped by a user with a free proximal end and a cylindrical distal end with an aperture therethrough adapted to be rotatably received on the upper peripheral wall of the brush body.

A bristle pad is provided with a plurality of bristles. The bristles have tips at a location remote from the brush body and the upper ends coupled to the bristle pad and located within the rectangular lower wall of the brush body. The bristles preferably are curved.

A push plate is provided with apertures receiving therethrough the bristles and with an interior central rod extending through the central aperture of the brush body with an operator controlled push button secured to the upper end thereof.

Further included is a coil spring within the upper cylindrical peripheral wall of the brush body adapted to push the pushbutton and bristle pad upwardly. The coil spring is adapted to be contracted upon the depression of the pushbutton by an operator to move the central rod downwardly with the pushplate along the length of the bristles for the removing of hair therefrom.

Lastly provided is a lock. The lock is adapted to hold the handle in a predetermined rotational orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet brush which has all of the advantages of the prior art brushes of known designs and configurations and none of the disadvantages.

It is another object of the present invention to provide a new and improved pet brush which may be easily and efficiently manufactured and marketed.

It is further object of the present invention to provide a new and improved pet brush which is of durable and reliable constructions.

An even further object of the present invention is to provide a new and improved pet brush which is susceptible of a low cost of manufacture with regard to both materials and labor, and which accordingly is then susceptible of low prices of sale to the consuming public, thereby making such pet brush economically available to the buying public.

Even still another object of the present invention is to provide a pet brush for removing hair from the bristles of a brush.

Yet another object of the present invention is to provide curved bristles, which advantageously reach further into matted hair of a pet, the curved bristles also advantageously being cleanable with the moving plate.

Lastly, it is an object of the present invention to provide a new and improved pet brush including a brush body. The brush body is in a generally rectangular configuration and has a central aperture therethrough and a lower rectangular peripheral wall of an enlarged diameter and an upper cylindrical peripheral wall. A handle is adapted to be grasped by a user with a free proximal end and a cylindrical distal end with an aperture. A bristle pad is provided with a plurality of bristles. The bristles have tips at a location remote from the brush body and the upper ends coupled to the bristle pad and located within the rectangular lower wall of the brush body. A push plate is included with apertures receiving therethrough the bristles and with an interior central rod extending through the central aperture of the brush body with an operator controlled push button secured to the upper end thereof. A spring is provided within the upper cylindrical peripheral wall of the brush body adapted to push the pushbutton and bristle pad upwardly but adapted to be contracted upon the depression of the pushbutton by an operator to move the central rod downwardly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the pet brush constructed in accordance with the principles of the present invention.

FIG. 2 is a top elevational view of the brush shown in FIG. 1.

The same reference numerals refer to the same parts through the various Figures.

DESCRIPTION OF THE PREFERRED EMBODIMENT

Figure 3:
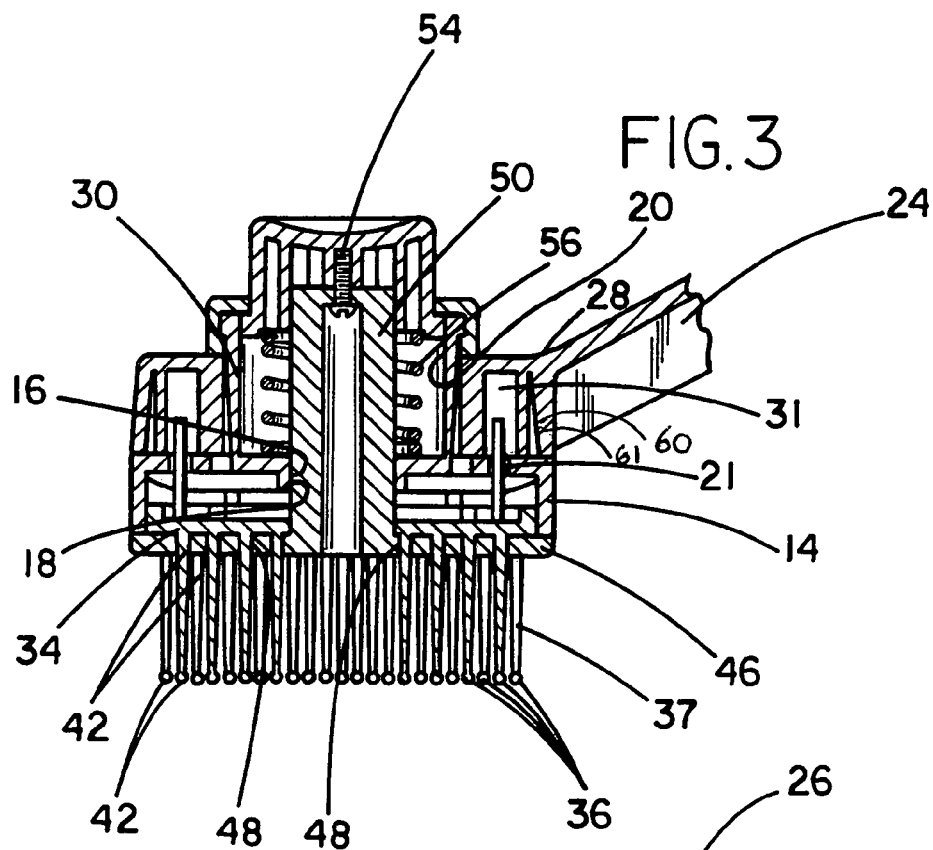
FIG. 3 is a cross-sectional view taken along line 3—3 of FIG. 2.

With reference now to the drawings, and in particular to FIG. 1 thereof, the preferred embodiment of the new and improved pet brush embodying the principles and concepts of the present invention and generally designated by the reference numeral 10 will be described.

The present invention, the pet brush 10 is comprised of a plurality of components. Such components in their broadest context include a brush body 14, a handle 24, a bristle pad 34, a push plate 46 and a coil spring 56. Such components are individually configured and correlated with respect to each other so as to attain the desired objective. The new and improved pet brush system 10 of the present invention has a rotating handle 24 and a sliding perforated plate 46 for removing hair from the bristles 36 of the brush 10 when the plate 46 slides from the base to the tips of the bristles 36.

The system includes a brush body 14. The brush body 14 is preferably in a generally rectangular configuration with a central aperture 16 therethrough. It may also have a lower rectangular peripheral wall 18 of an enlarged diameter. Further, it has an upper cylindrical peripheral wall 20 of a reduced diameter. Lastly, the brush body includes two pair of lock pin receiving apertures 21. The apertures 21 extend through the brush body 14.

A handle 24 is adapted to be grasped by a user with a free proximal end 26 and a cylindrical distal end 28. The distal end 28 has an aperture 30 therethrough. Such aperture 30 is adapted to be rotatably received on the upper peripheral wall 18 of the brush body 14. Further, the distal end 28 of the handle 24 includes two pair of lock pin receiving members 31. The lock pin receiving members 31 open downwardly from the distal handle 28.

The bristle pad 34 has a plurality of bristles 36. The bristles 36 have tips 40 at a location remote from the brush body 14. The upper ends 42 of the bristles 36 are coupled to the bristle pad 34 and located within the rectangular lower wall 18 of the brush body 14.

Figure 4:
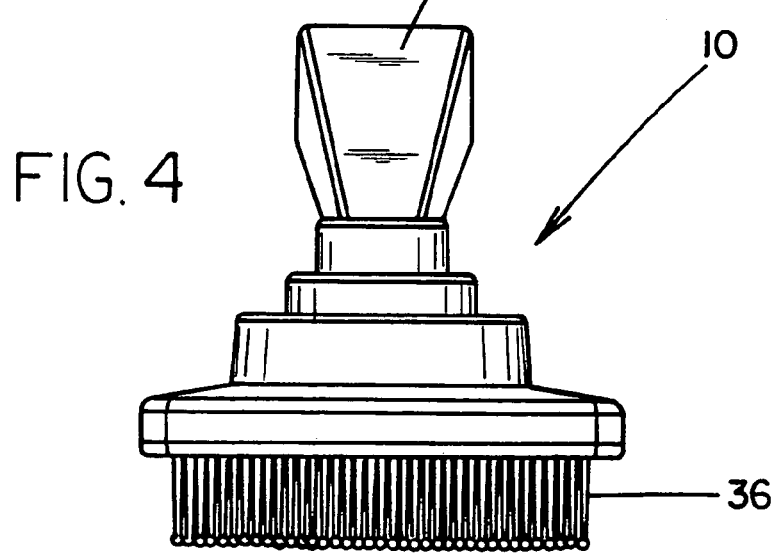
FIG. 4 is a front elevational view of the brush shown in FIGS. 1, 2 and 3.
Figure 5:
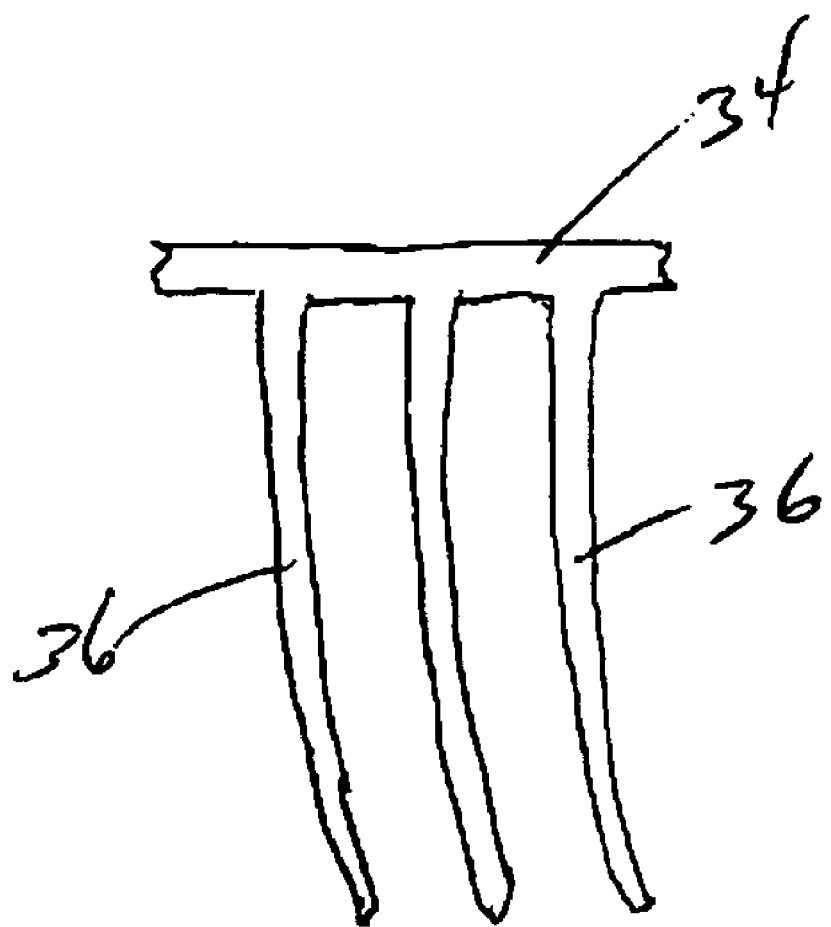
FIG. 5 is a side view showing curved bristles.

The bristles 36 are preferably curved, non-orthogonally oriented with respect to the bristle pad 34 and have a tapered length as FIGS. 3 and 4. The exposed end of the bristles 36 may have a rounded tip. In the preferred mode the bristles 36 are individually inserted into the bristle pad in rows as shown. Individual insertion has been found the best mode of inserting curved bristles 36 and the curved bristles are found desirable for good penetration into thick hair of pets. The bristles 36 may have a generally uniform diameter, perhaps 0.040 inches, throughout most of the length and then taper to a smaller point, perhaps 0.015 inches. The tapered portion may be near the exposed end extending for a short distance, perhaps 0.15 inches. The taper may be may of sufficient size, shape and length to provide improved penetration of matted pet hair.

A push plate 46 is additionally provided. Such push plate 46 has apertures 48 receiving the bristles 36 therethrough. The push plate 46 has an interior central rod 50 extending through the central aperture 16 of the brush body 14. An operator controlled push button 52 is secured to the upper end thereof, preferably by a bolt 54.

Further included is a coil spring 56. The spring 56 is located within the upper cylindrical peripheral wall 18 of the brush body 14. It is adapted to push the push button 52 away from the bristle pad 34. The coil spring 56 is adapted to be contracted upon the depression of the push button 52 by an operator. This acts to move the central rod 50 downwardly with the push plate 46 along the length of the bristles 36. This functions for the removing of hair therefrom.

Lastly provided may be a lock 60. The lock 60 is adapted to hold the handle 24 in a predetermined rotational orientation. Preferably, the lock 60 comprises a pair of lock pins 61. The lock pins 61 extend upwardly from the push plate 46 and through the lock pin receiving apertures 21 of the brush body 14 and into the lock pin receiving members 31 within the distal end 28 of the handle 24.

The pet brush system 10 of the present invention is a hair brush which has a sliding plate 46 to clear accumulated hair from the bristles 36 of the brush, and a rotating handle 24. The rotating handle 24 allows the brush 10 to work easily in restricted areas such as under the neck or legs of the pet. It also allows the brush 10 to cover a wider area when brushing in open areas such as the sides and back of a pet. The push plate 46 is a flat plate with holes through which the bristles 36 of the brush pass, and slides from the base of the bristles to a position flush with the tips of the bristles, thereby forcing hairs to or off the tips of the bristles 36. The push plate 46 is actuated via a push button 52 located at the top center of the brush body 14. A spring 56 between the brush body 14 and the push button 52 returns the push plate 46 to its stowed location.

The rotating handle 24 on the brush 10 is normally locked in position by two pins 61 which pass from the push plate 46 through the brush body 14 and into holes in the base of the handle 24. When the push button 52 is depressed, the two pins 61, affixed to the push plate 46, retract from the holes 31 in the handle 24 and allow the handle 24 to rotate relative to the brush body 14. There are four holes 31 in the base of the handle 24 which allow the handle 24 to be locked in any of four positions spaced ninety degrees apart.

The lock is adapted to hold the handle 24 in a predetermined rotational orientation with respect to the brush body 14. The lock may be released by depressing the push button 52, thereby allowing rotation of the brush handle 24 relative to the brush body 14. The lock mechanism consists of two cylindrical pins 61 which extend orthogonally from the upper surface of the push plate 46. The pins 61 may be located along a line through the center of the push plate 46 and may be equidistant from the center point of the push plate 46. When the button 52 is released and in the up position, the pins 61 pass through matching apertures 21 located in the brush body 14 and into matching lock pin receiving members 31 or holes located in the brush handle 24. The brush handle 24 is thereby secured from rotation relative to the brush body 14. When the button 52 is depressed, the pins 61 are moved out of the holes 31 in the brush handle 24, thereby allowing the brush handle 24 to rotate relative to the brush body 14. There preferably are four holes 31, two pair, located in the brush handle 24 which are spaced equidistant from the center of rotation of the brush handle 24 along an orthogonal axis. The placement of the holes 31 allows the brush handle 24 to be locked relative to the brush body 14 in four different orthogonal positions.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pet brush, comprising:
    a brush body having an aperture therethrough, a lower peripheral wall of an enlarged diameter and an upper peripheral wall of a reduced diameter;
    a handle adapted to be grasped by a user with a free proximal end and a distal end with an aperture therethrough adapted to be rotatably received on the upper peripheral wall of the brush body;
    a bristle pad joined to the brush body, the bristle pad including a plurality of bristles, upper ends of the bristles joined to the bristle pad extending therefrom to a bristle to respective tips;
    a push plate with apertures receiving the bristles therethrough, the push plate having an interior rod extending through the aperture of the brush body to an operator controlled push button, the push plate moving along the length of the bristles upon depression of the push button;
    a spring in operably communication with the pushbutton; and
    a lock adapted to selectively hold the handle in an orientation.

2. The brush as set forth in claim 1 wherein the brush body defines two pair of lock pin receiving apertures extending therethrough, the distal end of the handle defines two pair of lock pin receiving members opening downwardly therefrom and the lock comprises a pair of lock pins extending upwardly from the push plate, through the lock pin receiving apertures of the brush body and into the lock pin receiving members within the distal end of the handle.

3. The device of claim 1 wherein the push plate and bristles are oriented non-orthogonally with respect to each other.

4. The device of claim 1 wherein the bristles are curved.

5. The device of claim 1 wherein the upper ends of the bristles are of a larger diameter than the tips of the bristles.

6. A pet brush comprising:
    a brush body defining an aperture therethrough, having a lower wall and having an upper wall;
    bristles which extend away from the brush body, the bristles being curved relative to the brush body;
    a push plate defining apertures receiving the bristles therethrough, the push plate movable relative to the bristles;
    a handle joined to the brush body, the handle having proximal and distal ends;
    the brush body defines two pair of lock pin receiving apertures opening therethrough, the distal end of the handle defines two pair of lock pin receiving members extending downwardly therefrom and the lock comprises a pair of lock pins extending upwardly from the push plate and through the lock pin receiving apertures of the brush body and into the lock pin receiving members within the distal end of the handle.

7. The device of claim 6 wherein the push plate and bristles are oriented non-orthogonally with respect to each other.

8. The device of claim 6 wherein the upper ends of the bristles are of a larger diameter than the tips of the bristles.

9. A pet brush comprising:
a brush body having an aperture therethrough;
a handle connected to the brush body secured to upper ends of a plurality of bristles which extend therefrom to respective tips, the upper ends of the bristles having a larger diameter than the tips of the bristles and the handle is rotatably connected to the brush body;
a push plate with apertures receiving the bristles therethrough, the push plate having an rod extending through the aperture of the brush body and joined to an operator controlled push button and the push plate and bristles being curved;
and a spring contacting the brush body and the push button, the spring adapted to push the push button away from the brush body and adapted to contract upon the depression of the push button to move the rod through the brush body.

10. The pet brush as set forth in claim 9 and further including a lock adapted to hold the handle in a predetermined orientation with respect to the brush body.

11. The brush as set forth in claim 10 wherein the lock is actuated by actuating the push button.

12. A pet brush comprising:
a brush body connected to a plurality of bristles;
a push plate with apertures receiving said bristles therethrough, said push plate being movable with respect to the bristles, and the push plate and the bristles being curved with respect to each other;
including a handle rotatably connected to said brush body;
and a lock adapted to hold the handle in at least one rotational orientation with respect to the brush body.

13. The pet brush as set forth in claim 12 wherein the push plate is slidably connected to the brush body.

* * * * *